Figure 1:
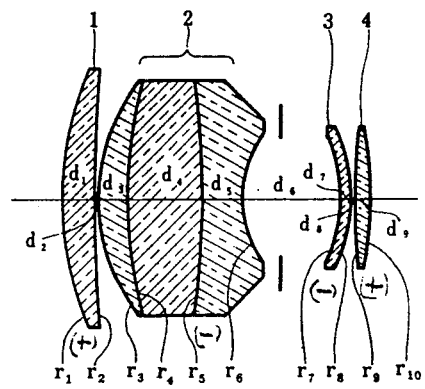

May 27, 1958

HIROSHI ITO 2,836,103

HIGH APERTURE TELEPHOTOGRAPHIC
OBJECTIVE OF THE GAUSS TYPE
Filed Jan. 3, 1957

INVENTOR.
HIROSHI ITO
BY
ATTORNEY

United States Patent Office 2,836,103
Patented May 27, 1958

2,836,103

HIGH APERTURE TELEPHOTOGRAPHIC OBJECTIVE OF THE GAUSS TYPE

Hiroshi Ito, Tokyo, Japan, assignor to Canon Camera Company, Inc., Tokyo, Japan, a corporation of Japan Application January 3, 1957, Serial No. 632,283

Claims priority, application Japan January 20, 1956

3 Claims. (Cl. 88—57)

This invention relates to photographic objectives and more particularly to high aperture photographic objectives of the Gauss type.

It is an object of this invention to provide a high aperture telephotographic objective of the Gauss type of simplified structure comprising six lenses of a relatively short total length, that is, almost equal to the focal length of the whole objective, to yield a relative aperture of almost $F=2.2$ and a whole angular field of about 24°. By said "total length" is meant the distance between the extreme point at the center of the first lens element and the focal point at the film plane.

In my U. S. Patent No. 2,645,973 entitled "High Aperture Four Component Objective of the Gauss Type," issued July 21, 1953, I have proposed a high aperture photographic objective comprising seven or eight lens elements having a relatively narrow picture angle, with a relative aperture of $F=1.4$ to $F=1.5$, particularly by means of predetermined specific values for the radii of curvature and refractive indices of the second and third components. The instant invention provides an improvement over the objective of the above identified patent by keeping the characteristics of high aperture according to the aforesaid theory to its extremity in a remarkably simplified structure to yield a total length, as above defined, equal to the focal length $f$ of the whole objective.

According to the instant invention, by replacing the third component of the aforesaid U. S. Patent No. 2,645,973 with a relatively thin, meniscus-shaped, concave lens and by selecting values within the specific range hereinafter mentioned, a useful lens system particularly effective for miniature cameras using 35 mm. film provides a relative aperture of $F=2.2$ and a picture angle of about 24° with a total length, as defined, almost equal to the focal length $f$ of the whole objective.

Figure 2:
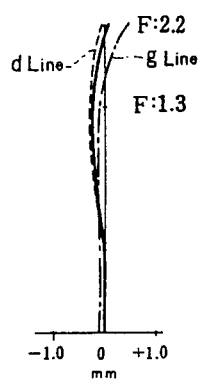
Figure 3:
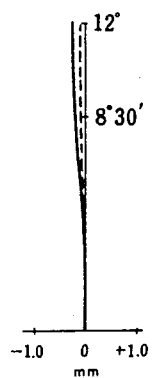
Figure 4:
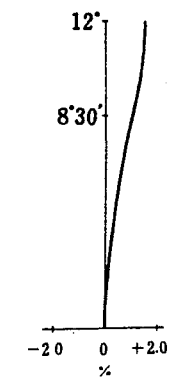

A clearer concept of the scope and purpose of the instant invention may be obtained from the description hereinafter following and the drawing forming a part hereof, in which:

Fig. 1 is a sectional elevation of a high aperture telephotographic objective according to the instant invention on its optical axis;

Fig. 2 shows the graphs of the spherical aberration and the unsatisfied amount of sine condition of an embodiment of the instant invention with the abscissae showing the amounts of aberration when $f$ is 100 mm. and the ordinates the distances of incoming rays of light from the optical axis in F-numbers. The full line shows the spherical aberration; the dashed line, the unsatisfied amount of sine condition on the $d$-line of the spectrum; and the dotted chain line shows the spherical aberration value on the $g$-line of the spectrum;

Fig. 3 shows the graphs of the astigmatic aberration with the abscissae showing the amounts of aberration when $f$ is 100 mm., and the ordinates showing the incidence angles included between the principal ray and the optical axis; the full line showing sagittal curvature and the dotted line showing meridional curvature; and Fig. 4 shows the graph of the distortion; the abscissae showing its percentages and the ordinates the incidence angles included between the principal ray and the optical axis.

According to the instant invention the telephotographic objective of the Gauss type comprises six lens elements, the first component 1 consisting of a meniscus-shaped convex lens with its convex surface towards the object. The second component 2 is a compound meniscus-shaped concave lens consisting of three lens elements cemented together in the following order from object to image side, a meniscus-shaped convex lens, a biconvex lens and a biconcave lens, the convex surface of the second component being towards the object. The third component 3 is a meniscus-shaped concave single lens with its convex surface towards the image side and the fourth component 4 a single biconvex lens, a diaphragm being positioned between the second component and the third component.

The characteristic conditions of the instant objective are as follows, the radii of curvature of the lens surfaces are denoted by reference symbols $r_1, r_2 \ldots r_{10}$, the axial distances of adjacent surfaces are denoted by reference symbols $d_1, d_2 \ldots d_9$, and the refractive indices on the $d$-line of the spectrum are denoted by reference symbols $n_1, n_2 \ldots n_6$, all in increasing order from the object to the image side; and $f$ is the total focal length of the objective:

Condition 1: $0.8 f < (d_3+d_4+d_5) < 0.36 f$

Condition 2: $0.02 < (n_2-n_3) < 0.15, \ 0.05 < (n_4-n_3) < 0.20$

Condition 3: $0.15 f < d_6 < 0.26 f$

Condition 4: $0.21 f < |r_7| < 0.38 f, \ 0.01 f < d_7 < 0.06 f$

Condition 5: $1 < \left|\dfrac{r_9}{r_{10}}\right| < 8$

Conditions 1 and 3 above are determinative of the Petzval sum and the total length at the desired values; the condition 2 is to correct particularly the spherical aberration; and conditions 4 and 5 are advantageous for correcting the coma and the distortion of image respectively.

For the ease of explanation the second component of the objectives according to the instant invention is described as three lens elements cemented together. However, in view of the presently, highly advanced technical skill in coating processes to reduce reflection, it is obvious that a relatively small air space may be provided instead of the aforesaid cemented surfaces in order to satisfactorily complete the correction of aberrations.

The data of a practical example in accordance with the instant invention is as follows:

[$f=100$. The total length of the whole objective=1.02 $f$. $F=2.2$. $2\alpha=24°$.]

| Component | r | d | $n_d$ | v |
|---|---|---|---|---|
| 1 | $r_1 = 65.0$ | $d_1 = 6.5$ | $n_1 = 1.6204$ | $v_1 = 60.3$ |
|  | $r_2 = 330.0$ | $d_2 = 0.2$ |  |  |
| 2 | $r_3 = 37.0$ | $d_3 = 5.5$ | $n_2 = 1.6204$ | $v_2 = 60.3$ |
|  | $r_4 = 85.0$ | $d_4 = 15.0$ | $n_3 = 1.5687$ | $v_3 = 63.1$ |
|  | $r_5 = -180.0$ | $d_5 = 7.5$ | $n_4 = 1.6889$ | $v_4 = 31.1$ |
|  | $r_6 = 22.97$ | $d_6 = 19.0$ |  |  |
| 3 | $r_7 = -30.0$ | $d_7 = 2.0$ | $n_5 = 1.6477$ | $v_5 = 33.9$ |
|  | $r_8 = -38.0$ | $d_8 = 0.3$ |  |  |
| 4 | $r_9 = 150.0$ | $d_9 = 3.2$ | $n_6 = 1.6727$ | $v_6 = 32.2$ |
|  | $r_{10} = -77.1$ |  |  |  |

As obviously apparent from the graphs of the aberrations in Figs. 2, 3 and 4, illustrating the performance of the objective according to the instant invention, a high aperture telephotographic object of the Gauss type is provided to yield a relative aperture of almost $F=2.2$ and a picture angle of about 24° with a total length almost equal to the focal length of the whole objective with various aberrations superbly corrected.

What I claim is:

1. A high aperture telephotographic objective of the Gauss type comprising six lens elements grouped into four air-spaced components, of which objective the total length is substantially equal to the total focal length $f$ thereof, the first component being a meniscus-shaped convex single lens with its convex surface towards the object, the second component is of a concave meniscus shape and consists of three lens elements cemented successively to each other and being in order from the object side, a second meniscus-shaped convex lens, a biconvex lens and a biconcave lens, the convex surface of the second component facing towards the object, the third component is a meniscus-shaped concave single lens with its convex surface towards the image side, and the fourth component is a second biconvex single lens, and a diaphragm is interposed between the second component and the third component, the objective meeting following conditions:

Condition 1: $0.18 f < (d_3+d_4+d_5) < 0.36 f$

Condition 2: $0.02 < (n_2-n_3) < 0.15$, $0.05 < (n_4-n_3) < 0.20$

Condition 3: $0.15 f < d_6 < 0.26 f$

Condition 4: $0.21 f < |r_7| < 0.38 f$, $0.01 f < d_7 < 0.06 f$

Condition 5: $1 < \left|\dfrac{r_9}{r_{10}}\right| < 8$ where the radii of curvature of the lens surfaces are denoted by $r_1, r_2 \ldots r_{10}$, the axial distances between adjacent surfaces by $d_1, d_2 \ldots d_9$, and the refractive indices on the $d$-line of the spectrum by $n_1, n_2 \ldots n_6$, in the order respectively from the object side.

2. A high aperture telephotographic objective of the Gauss type comprising four air spaced components of a total length substantially equal to the total focal length $f$ of the objective, of which the object side and first component is a meniscus-shaped convex lens with its convex surface towards the object side of the objective, the succeeding and second component is of concave meniscus shape and consists of a second meniscus-shaped convex lens, a biconvex lens and a biconcave lens of which three lenses each two adjacent surfaces have equal radii of curvature and are spaced at negligible air gap distances from each other, the convex surface of the second component facing the object side, a diaphragm beyond the second component, a meniscus concave lens constitutes the third component beyond the diaphragm of which third component the convex surface faces the image side of the objective, and the fourth component is a second biconvex lens, the objective complying with the following requirements:

$0.18 f < (d_3+d_4+d_5) < 0.36 f$ $0.02 < (n_2-n_3) < 0.15$ and $0.05 < (n_4-n_3) < 0.20$ $0.15 f < d_6 < 0.26 f$ $0.21 f < |r_7| < 0.38 f$ and $0.01 f < d_7 < 0.06 f$ $1 < \left|\dfrac{r_9}{r_{10}}\right| < 8$ where the radii of curvature of the lens surfaces are denoted by $r_1, r_2, \ldots r_{10}$, the axial distances between adjacent surfaces by $d_1, d_2, \ldots d_9$, and the refractive indices on the $d$-line of the spectrum by $n_1, n_2, \ldots n_6$, in the order of increasing magnitude from the object side.

3. A high aperture telephotographic objective of the Gauss type comprising four air spaced components, the objective having a total length equal to $1.02 f$ where $f$ is the total focal length of the objective, the components in succession from the object to the image side being a meniscus-shaped convex lens with its convex surface towards the object side of the objective, the second component is of concave meniscus shape and consists of a second meniscus-shaped convex lens, a biconvex lens and a biconcave lens of which three lenses the adjacent surfaces of adjacent lenses have the same radius of curvature and are pressed together, the convex surface of the second component facing the object side, the third component is a meniscus-shaped concave single lens with its convex surface facing the image side of the objective, and the fourth component is a second biconvex single lens, a diaphragm being interposed between the second and third components, of which objective the numerical data is substantially as follows:

[$f=100$    $F=2.2$    $2\alpha=24°$.]

| Component | Radius | Distance | Refractive Index | Abbe Number |
|---|---|---|---|---|
| I | $r_1 = 65.0$ | $d_1 = 6.5$ | $n_1 = 1.6204$ | $v_1 = 60.3$ |
|   | $r_2 = 330.0$ | $d_2 = 0.2$ |   |   |
| II | $r_3 = 37.0$ | $d_3 = 5.5$ | $n_2 = 1.6204$ | $v_2 = 60.3$ |
|   | $r_4 = 85.0$ | $d_4 = 15.0$ | $n_3 = 1.5687$ | $v_3 = 63.1$ |
|   | $r_5 = -180.0$ | $d_5 = 7.5$ | $n_4 = 1.6889$ | $v_4 = 31.1$ |
|   | $r_6 = -22.97$ | $d_6 = 19.0$ |   |   |
| III | $r_7 = -30.0$ | $d_7 = 2.0$ | $n_5 = 1.6477$ | $v_5 = 33.9$ |
|   | $r_8 = -38.0$ | $d_8 = 0.3$ |   |   |
| IV | $r_9 = 150.0$ | $d_9 = 3.2$ | $n_6 = 1.6727$ | $v_6 = 32.2$ |
|   | $r_{10} = -77.1$ |   |   |   | where $r_{\text{subscript}}$ is the radius of the lens surface, $d_{\text{subscript}}$ the axial distance from a lens surface to the succeeding lens surface, $n_{\text{subscript}}$ the refractive index of the glass of the lens, and $v_{\text{subscript}}$ the Abbe number of the glass, each series of subscripts increasing in the order of the position thereof in the direction from the object to the image side of the objective.

References Cited in the file of this patent

UNITED STATES PATENTS

| | | |
|---|---|---|
| 1,998,704 | Bertele | Apr. 23, 1935 |
| 2,141,733 | Bertele | Dec. 27, 1938 |
| 2,158,507 | Konig | May 16, 1939 |
| 2,186,621 | Bertele | Jan. 9, 1940 |
| 2,622,479 | Bertele | Dec. 23, 1952 |
| 2,645,973 | Ito | July 21, 1953 |
| 2,718,174 | Doi | Sept. 20, 1955 |

FOREIGN PATENTS

| | | |
|---|---|---|
| 350,323 | Great Britain | June 11, 1931 |